(12) United States Patent
Kim et al.

(10) Patent No.: US 8,667,221 B2
(45) Date of Patent: Mar. 4, 2014

(54) DETECTION OF STREAMING DATA IN CACHE

(75) Inventors: Changkyu Kim, San Jose, CA (US); Christopher J. Hughes, Cupertino, CA (US); Yen-Kuang Chen, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 815 days.

(21) Appl. No.: 12/099,502

(22) Filed: Apr. 8, 2008

(65) Prior Publication Data

US 2010/0005241 A1    Jan. 7, 2010

(51) Int. Cl.
*G06F 12/08*    (2006.01)

(52) U.S. Cl.
USPC .......................................... 711/122; 711/133

(58) Field of Classification Search
USPC .................................. 711/144, 133
See application file for complete search history.

(56) References Cited

U.S. PATENT DOCUMENTS

| | | | | |
|---|---|---|---|---|
| 5,546,559 | A * | 8/1996 | Kyushima et al. | 711/133 |
| 6,578,111 | B1 * | 6/2003 | Damron et al. | 711/133 |
| 7,099,999 | B2 * | 8/2006 | Luick | 711/137 |
| 2006/0224830 | A1 * | 10/2006 | Davis et al. | 711/136 |
| 2008/0022049 | A1 | 1/2008 | Hughes et al. | |
| 2009/0144506 | A1 * | 6/2009 | Barth et al. | 711/129 |

OTHER PUBLICATIONS

Bob Zeidman, Verilog Designer's Library, 1999, Prentice Hall PTR, pp. 69-70.*
M. K. Qureshi, A. Jaleel, Y. N. Patt, S. C. Steely Jr., J. S. Emer "Adaptive insertion policies for high performance caching", ISCA 2007: 381-391.
S. Sohoni, "Improving L2 Cache Performance through Stream-Directed Optimizations", PhD Dissertation, University of Cincinnati, Cincinnati, Ohio, Sep. 2004.
T. Johnson, W. Hwu, "Run-Time Adaptive Cache Hierarchy Management via Reference Analysis," in ISCA, pp. 315-326, Jun. 1997.
T. Johnson, M. Merten, and W. Hwu, "Run-time spatial locality detection and optimization," in MICRO, pp. 57-64, Dec. 1997.

* cited by examiner

*Primary Examiner* — Kaushikkumar Patel
(74) *Attorney, Agent, or Firm* — Trop, Pruner & Hu, P.C.

(57) ABSTRACT

An apparatus to detect streaming data in memory is presented. In one embodiment the apparatus use reuse bits and S-bits status for cache lines wherein an S-bit status indicates the data in the cache line are potentially streaming data. To enhance the efficiency of a cache, different measures can be applied to make the streaming data become the next victim during a replacement.

16 Claims, 6 Drawing Sheets

DETECTION OF STREAMING DATA IN CACHE

FIELD OF THE INVENTION

The invention relates to cache memory and, more specifically to the detection of streaming data therefore to prevent the pollution of a cache and to increase the efficiency of cache memory.

BACKGROUND OF THE INVENTION

Processors and memories are key components in a computer system to perform various operations based on instructions and data given. As a processor is usually faster than its storage memory, there is a substantial amount of time while waiting for the memory to respond to a memory request. The system performance can degrade as the gap between the operating speeds of the processor and the memory increases. Fast memory is crucial to enhance the performance of computer systems, but is expensive to manufacture. A trade-off solution to this problem is to supply layers of fast local storage memory, namely cache memory, with different speeds and capacities between processors and the main storage devices.

Cache memory is built with fast memory technology. It is expensive and is usually built in small capacity relative to a main memory to save cost. A cache mirrors several segments in the main memory such that the processor can retrieve data from the cache which has faster cycle time.

In general, a cache nearer to a processor is built to perform at a faster speed and is more costly than the cache further down the memory hierarchy. The cache that is closest to a processor is called a level 1 (L1) cache. It is followed by another cache, namely a level 2 (L2) cache and the number increases as it moves down the memory hierarchy. For a cache at any level, the adjacent cache that is located closer to the processor's end is referred to as an upstream cache. A downstream cache refers to an adjacent cache that is located closer to the end of main memory side of the memory hierarchy. For example, a L1 cache is the upstream cache with respect to a L2 cache.

A cache is generally smaller than its downstream caches. During normal operations, contents in a cache will be evicted according to replacement policies to free up space for storing newly fetched data. To increase the performance of a cache, it is important to retain the data that are frequently accessed and to remove data that will not be required in the near future (e.g., data that are only required once). In some cases, the conflicts are inevitable, as the data access pattern is mostly random. On the other hand, some classes of access patterns can trigger a high miss rate depending on cache sizes, data sizes and the reusability of data.

Streaming data refers to one or more chunks of related data that, when combined, are larger than the cache size of a cache storing a portion of the data. The chunks of data can be stored either contiguously or non-contiguously in a memory space. Streaming data can be in various data structures, containing information for different types of content and applications. In most cases, these data are required only once and will be evicted without being reused. If this type of data is treated as other data in a cache, it will cause other important data to be evicted which otherwise would have stayed in the cache. When frequently used data are evicted in favor of data that will not be reused, this is an indication of cache pollution. It is unlikely for a programmer to know the configuration of all different caches located in various computer systems at the time of writing programs and hence it is impossible to tailor the programs for each system configuration to prevent cache pollution.

BRIEF DESCRIPTION OF THE DRAWINGS

The present invention is illustrated by way of example and is not limited by the figures of the accompanying drawings, in which like references indicate similar elements, and in which.

DETAILED DESCRIPTION OF THE INVENTION

Embodiments of a method and apparatus for detecting and reducing cache pollution from streaming data are described. In the following description, numerous specific details are set forth. However, it is understood that embodiments may be practiced without these specific details. In other instances, well-known elements, specifications, and protocols have not been discussed in detail in order to avoid obscuring the present invention.

An embodiment of the present invention is an apparatus to detect streaming data by using additional status bit for cache lines. By detecting streaming data, the pollution of cache may be avoided. In one embodiment, the apparatus reclassifies the data if an earlier classification is not accurate or when the access pattern for the data has changed.

Figure 1:
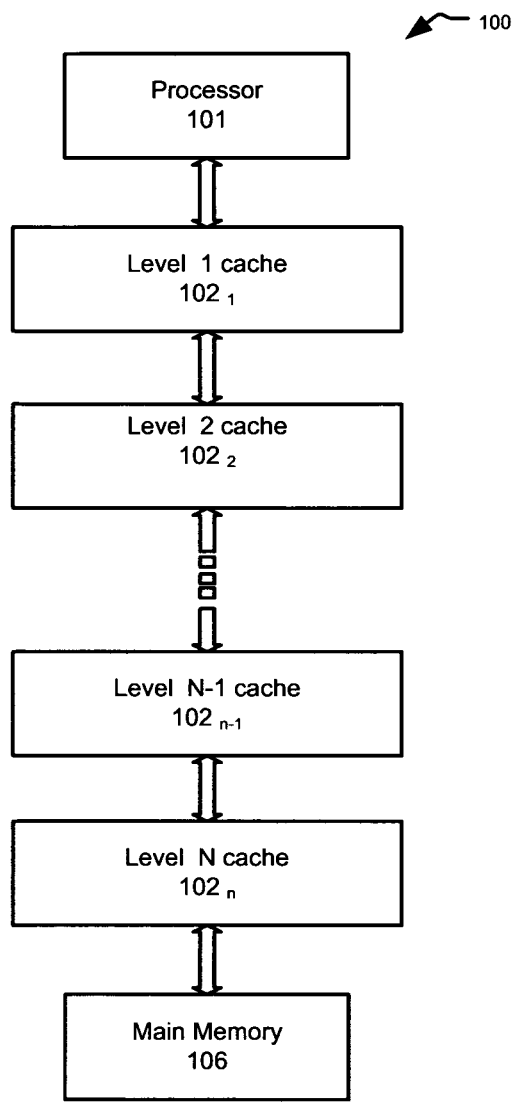
FIG. 1 is a simplified view of a memory hierarchy for a computer system.

FIG. 1 is a simplified view of a memory hierarchy for a computer system which may be used with embodiments of the present invention. Many related components such as buses and peripherals have not been shown to avoid obscuring the invention. Referring to FIG. 1, the memory hierarchy comprises of a processor 101, a main memory unit 106 and several levels of cache memories $102_1$-$102_n$. The processor 101 operates based on instructions and data given. These instructions and program are usually stored in hard disk and being fetched into main memory unit and then to the processor 101 when they are required. The speed of processor 101 is often faster than the speed of memory. In order to increase the efficiency of the processor 101, cache memories $102_1$-$102_n$ are included between processor 101 and main memory unit 106.

Embodiments of the invention are applicable to all the levels of cache memory or to selected levels of the caches. To facilitate the description, two levels of caches in operation are discussed. A target cache refers to the cache where detection of streaming data is intended. A group of related data is categorized as streaming data when their size is larger than the capacity of a target cache. Streaming data are often evicted before they are reused to free up space for the remaining data that did not fit in the target cache.

Figure 2:
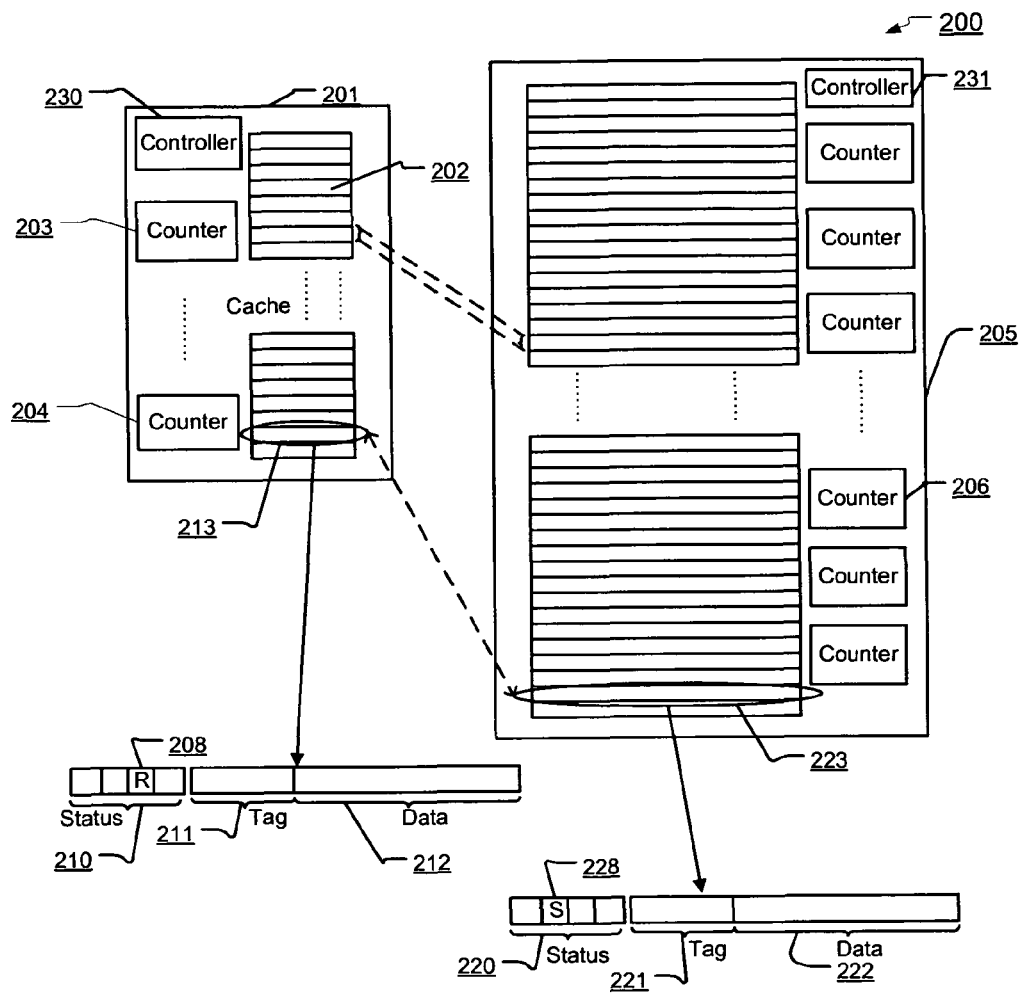
FIG. 2 shows a cache, a downstream cache and an inset to a cache line in the cache.

FIG. 2 shows a cache 201 and its downstream cache 205. Cache 201 contains particular sections of data stored in the downstream cache 205. Cache 201 stores a sequence of cache lines. Each cache line (e.g., 202, 213, 223) as shown in the inset is comprised of three sections, namely status bits 210, a tag section 211 and data 212. Data section 212 is the actual information that is stored in the cache line and can be used in the operations of computer systems. The tag section 211 contains an address tag, which is well known in the art. The status section 210 contains information (e.g., status indicators (e.g., bits)) about the current state of the data stored in the cache line, such as dirty bit, validity bit and coherence bit. In one embodiment, reuse bit 208 and S-bit 228 support the desired function of detecting potentially streaming data. Reuse bit 208 for cache line 213 is cleared (i.e., the bit value is '0') when the data is first brought in to the cache. If the data is reused (accessed again) reuse bit 208 will be set (i.e., the bit value is '1'). In one embodiment, when a cache line is evicted and its corresponding reuse bit is clear (i.e., the bit value is '0', indicating the corresponding cache line has not been used), the cache line is classified as potentially streaming data. S-bit 228 for a corresponding cache line 223 in the downstream cache will be set to indicate the data in the cache line are potentially streaming data.

In one embodiment, the cache memories include controllers 230 and 231 that manage activities in the cache memories including updating (e.g., setting, changing, clearing, etc.) the status bits. Each controller could include multiple controllers. The controllers could be located inside or outside of a cache.

Cache line 223 in downstream cache with its S-bit 228 being set indicates a cache line of potentially streaming data. It is possible that the data is not streaming data, but was evicted due to cache pollution (i.e., other data that are streaming caused the data to be evicted before they could be reused). It is also possible that the access pattern to the data will change in the future of the program execution. In this case, the data are slowly allowed to be reclassified as non-streaming data. If the data are indeed streaming data, the data will quickly be classified as streaming data again when they are evicted and reuse bit 208 being clear, with little negative effect. However, if the data are not streaming data anymore (or never were), they can be treated as non-streaming, and the target cache can take advantage of their temporal locality (to reuse again in near future).

In one embodiment, controllers (e.g., 230 and 231) determine if a cache line has to be reclassified based on the values of counters (e.g., 206). The values of counters are updated (e.g. increased, decreased, initialized) by the controllers (e.g., 230 and 231). Counter 206 could be associated with one or more cache lines.

Figure 3:
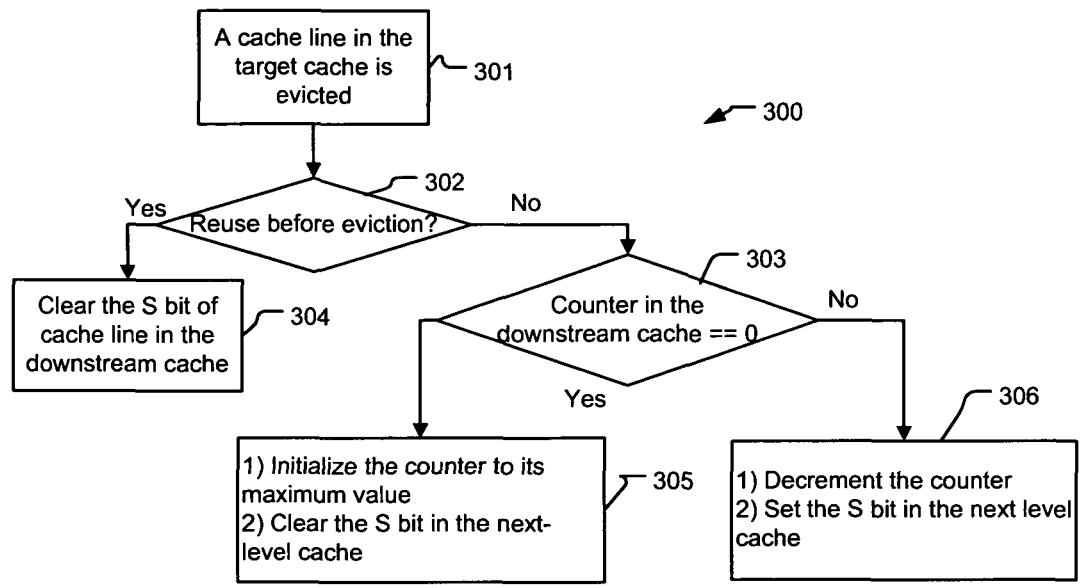
FIG. 3 is a flow diagram of one embodiment of a process to detect potentially streaming data, driven by a downstream cache.

FIG. 3 shows a flow diagram for one embodiment of a process to detect potentially streaming data, and classify the status of data as potentially streaming or non-streaming. The process is performed by processing logic that may comprise hardware (circuitry, dedicated logic, etc.), software (such as one that is run on a general purpose computer system or a dedicated machine), or a combination of both. In one embodiment, the processing logic is multiple controllers (e.g., controller 230, controller 231).

Referring to FIG. 3, the process begins by the processing logic determining if data in a cache line have been reused when the cache line is evicted (processing block 301, 302). If data have been reused, processing logic clears the S-bit of the corresponding cache line in the downstream cache to indicate the cache line is not considered streaming data (processing block 304). Otherwise, classify the status of data as potentially streaming or non-streaming. If data have not been reused, processing logic determines whether the counter value associated with the cache line in the downstream cache is decreased to zero or not (processing block 303). If the counter value is zero, the counter is then initialized to a predetermined value and the S-bit of the cache line in the downstream cache is cleared (processing block 305). Otherwise, if the counter value is not zero, processing logic decreases the counter value and sets the S-bit of the cache line in the downstream cache to indicate that the cache line is potentially streaming data (processing block 306).

Figure 4:
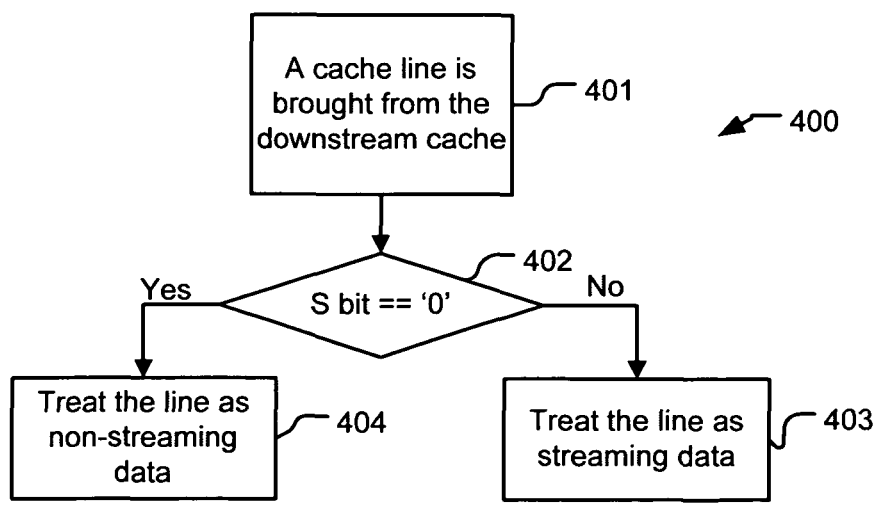
FIG. 4 is a flow diagram of one embodiment of a process to reclassify potentially streaming data, driven by a downstream cache.

FIG. 4 shows a flow diagram for one embodiment of a process to prevent streaming data from polluting the cache. The process is performed by processing logic that may comprise hardware (circuitry, dedicated logic, etc.), software (such as one that is run on a general purpose computer system or a dedicated machine), or a combination of both. In one embodiment, the processing logic is multiple controllers (e.g., controller 230, controller 231).

Referring to FIG. 4, in one embodiment, a cache line is brought in from a downstream cache to the target cache (processing block 401). Processing logic checks whether the S-bit in the cache line being brought in is zero or not (processing block 402). If the S-bit is zero, processing logic treats the cache line as non-streaming data (processing block 404). Otherwise, processing logic treats the cache line as potentially streaming data (processing block 403).

Figure 5:
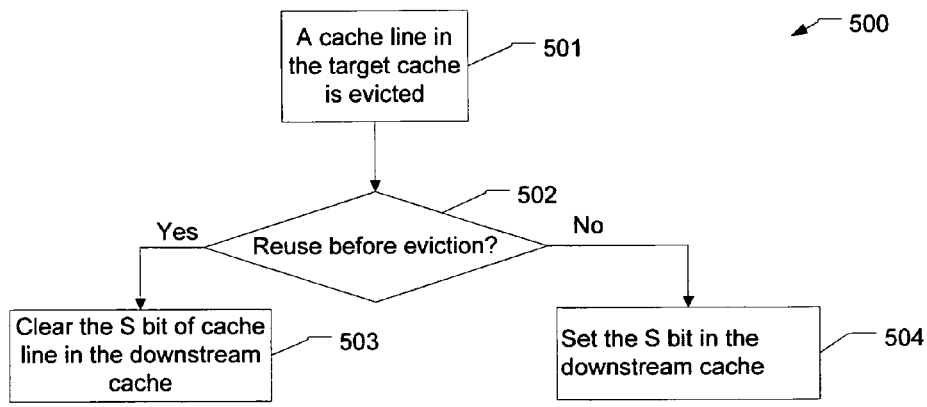
FIG. 5 is a flow diagram of one embodiment of a process to detect potentially streaming data, driven by a target cache.

FIG. 5 shows a flow diagram for one embodiment of a process to detect potentially streaming data. The process is performed by processing logic that may comprise hardware (circuitry, dedicated logic, etc.), software (such as one that is run on a general purpose computer system or a dedicated machine), or a combination of both. In one embodiment, the processing logic is multiple controllers (e.g., controller 230, controller 231).

Referring to FIG. 5, the process begins by processing logic determining if data in a cache line have been reused when the cache line is evicted (processing block 501, 502). If data have been reused, processing logic clears the S-bit of the corresponding cache line in the downstream cache to indicate the cache line is not considered streaming data (processing block 503). Otherwise, if data have not been reused, processing logic sets the S-bit of the cache line in the downstream cache to indicate that the cache line is potentially streaming data (processing block 504).

Figure 6:
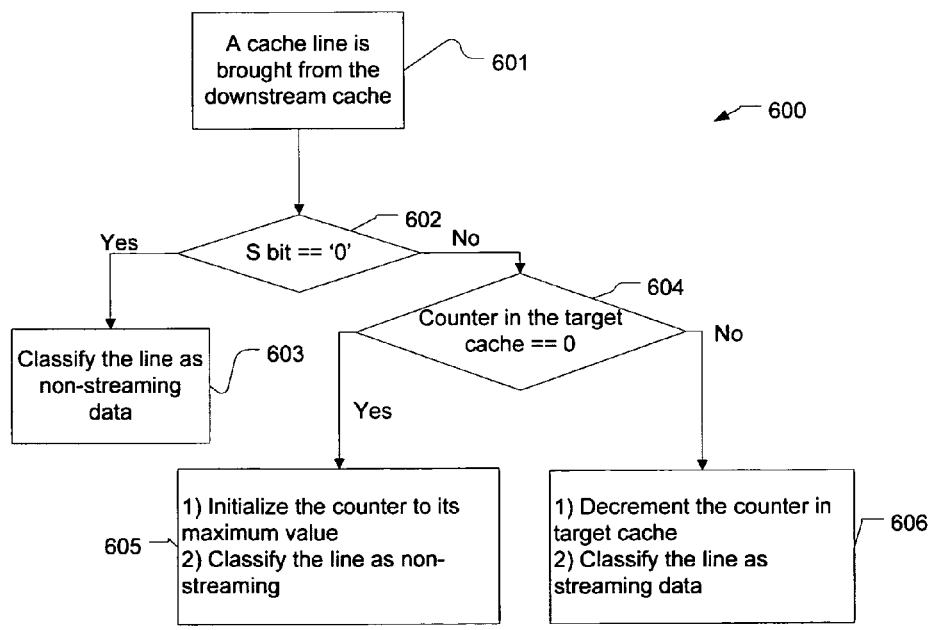
FIG. 6 is a flow diagram of one embodiment of a process to reclassify potentially streaming data, driven by a target cache.

FIG. 6 shows a flow diagram for one embodiment of a process to reclassify the status of data as potentially streaming or otherwise, and prevent streaming data from polluting the cache. The process is performed by processing logic that may comprise hardware (circuitry, dedicated logic, etc.), software (such as one that is run on a general purpose computer system or a dedicated machine), or a combination of both. In one embodiment, the processing logic is multiple controllers (e.g., controller 230, controller 231).

Referring to FIG. 6, in one embodiment, a cache line is brought in from a downstream cache to the target cache (processing block 601). Processing logic determines whether the S-bit in the cache line being brought in is zero or not (processing block 602). If the S-bit is zero, processing logic treats the cache line as non-streaming data (processing block 603). Otherwise, processing logic determines whether the counter value associated with the cache line in the target cache is zero or not (processing block 604). If the counter value is zero, processing logic initializes the counter value to a predetermined value and classifies the line as non-streaming cache (processing block 605). Otherwise if the counter value is not zero, processing logic decreases the counter value and classifies the line as potentially streaming data (processing block 606).

For the purpose of updating the counter's value to control when a cache line is to be reclassified as non-streaming data, four different policies are presented here, namely, (1) the fixed policy, (2) dynamic policy, (3) adaptive policy, and (4) the MRU information policy.

The fixed policy uses a fixed value for initialization and decreases the counter value by 1 every time either (a) a cache line is evicted from the target cache without being reused (in the first embodiment) or (b) a cache line, with its S-bit set, is brought from the downstream cache into the target cache (in the second embodiment). Basically, the counter controls the frequency of treating potentially streaming data as streaming data. A higher initialization value means data in the cache line are treated as streaming data more often than they are not. For example, if the counter is initialized to 63 (i.e., using a 6-bit counter), this allows the cache line to be reclassified as non-streaming data once for every 64 times of the event (a) or (b).

The optimal value for initializing the counter differs from application to application, and also depends on the size of the target cache. In one embodiment, processing logic uses a dynamic policy. A fixed, minimum value for initialization (for example '1') is used. The value of the counter doubles every time a cache line is evicted when its reuse bit is clear, until the counter saturates. One reason for using a dynamic policy is that burst of evictions caused by streaming data should raise the bar for reclassification of data as non-streaming data.

In one embodiment, processing logic uses an adaptive policy. A second counter (known as "adaptive initial counter") keeps track of the initialization value for the primary counter. Every time a cache line is evicted from the target cache when the reuse bit is clear, the value of the adaptive initial counter is doubled, until it saturates. Likewise, the value of the adaptive initial counter is decreased by half every time a cache line is evicted when the reuse bit is set. This policy allows the mechanism to quickly adapt to bursty behavior of both data access pattern (streaming and non-streaming).

In one embodiment, processing logic uses the MRU (most recently used) information commonly available in cache memories. For example, the target cache is a level 2 (L2) cache and the downstream cache is a level 3 (L3) cache. Assuming that a single way of the L3 cache is of size X, and the size of the L2 cache is Y. Let k be the round up integer value of the quotient of X/Y. In this case, the counter is decremented by one whenever an eviction occurs when the reuse bit of the cache line is clear and when a hit occurs in the k MRU ways of the L3 cache.

One of the advantages of detecting streaming data is that the information can be then utilized to avoid streaming data pollution in the target cache. Preventing cache pollution could help to improve the "hit" ratio of a target cache. There are multiple ways to treat potentially streaming data to achieve this goal. Three embodiments are presented here:

(1) Data treated as streaming data bypass the target cache entirely to avoid pollution by the streaming data.

(2) Data treated as streaming data are placed in the LRU (least recently used) way in the cache (assuming an LRU replacement policy).

(3) Data treated as streaming data are placed in a small buffer next to the target cache. Using an example of level 2 cache as the target cache, on a miss at the upstream cache (for example level 1), the buffer is searched in parallel to the target cache.

Embodiments of the invention may be implemented in a variety of electronic devices and logic circuits. Furthermore, devices or circuits that include embodiments of the invention may be included within a variety of computer systems. Embodiments of the invention may also be included in other computer system topologies and architectures.

Figure 7:
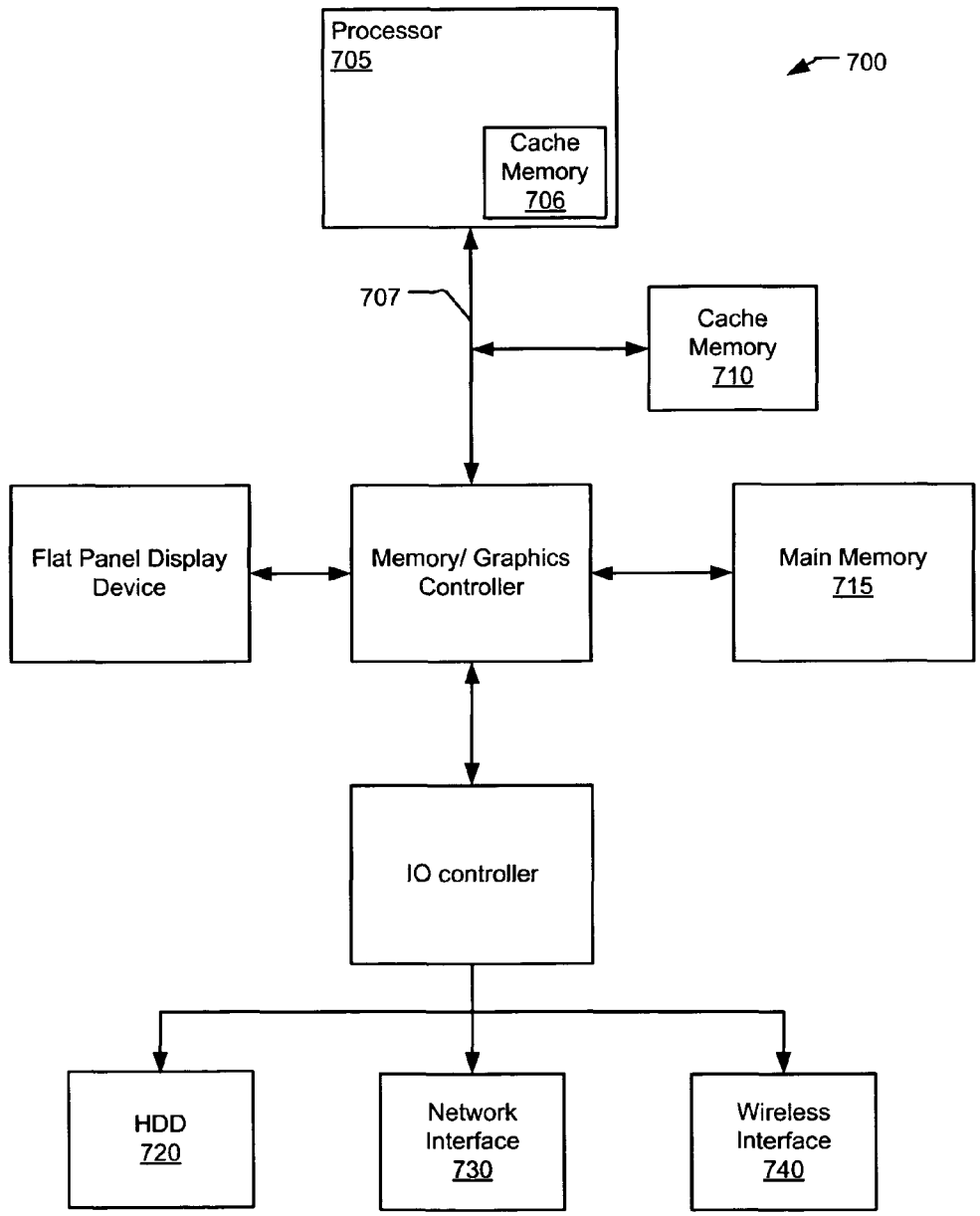
FIG. 7 illustrates a computer system in which one embodiment of the invention may be used.

FIG. 7, for example, illustrates a front-side-bus (FSB) computer system in which one embodiment of the invention may be used. A processor 705 accesses data from a level 1 (L1) cache memory 706, a level 2 (L2) cache memory 710, and main memory 715. In other embodiments of the invention, the cache memory 706 may be a multi-level cache memory comprise of an L1 cache together with other memory such as an L2 cache within a computer system memory hierarchy and cache memory 710 are the subsequent lower level cache memory such as an L3 cache or more multi-level cache. Furthermore, in other embodiments, the computer system may have the cache memory 710 as a shared cache for more than one processor core.

The processor 705 may have any number of processing cores. Other embodiments of the invention, however, may be implemented within other devices within the system or distributed throughout the system in hardware, software, or some combination thereof.

The main memory 710 may be implemented in various memory sources, such as dynamic random-access memory (DRAM), a hard disk drive (HDD) 720, or a memory source located remotely from the computer system via network interface 730 or via wireless interface 740 containing various storage devices and technologies. The cache memory may be located either within the processor or in close proximity to the processor, such as on the processor's local bus 707. Furthermore, the cache memory may contain relatively fast memory cells, such as a six-transistor (6T) cell, or other memory cell of approximately equal or faster access speed.

Other embodiments of the invention, however, may exist in other circuits, logic units, or devices within the system of FIG. 7. Furthermore, in other embodiments of the invention may be distributed throughout several circuits, logic units, or devices illustrated in FIG. 7.

Figure 8:
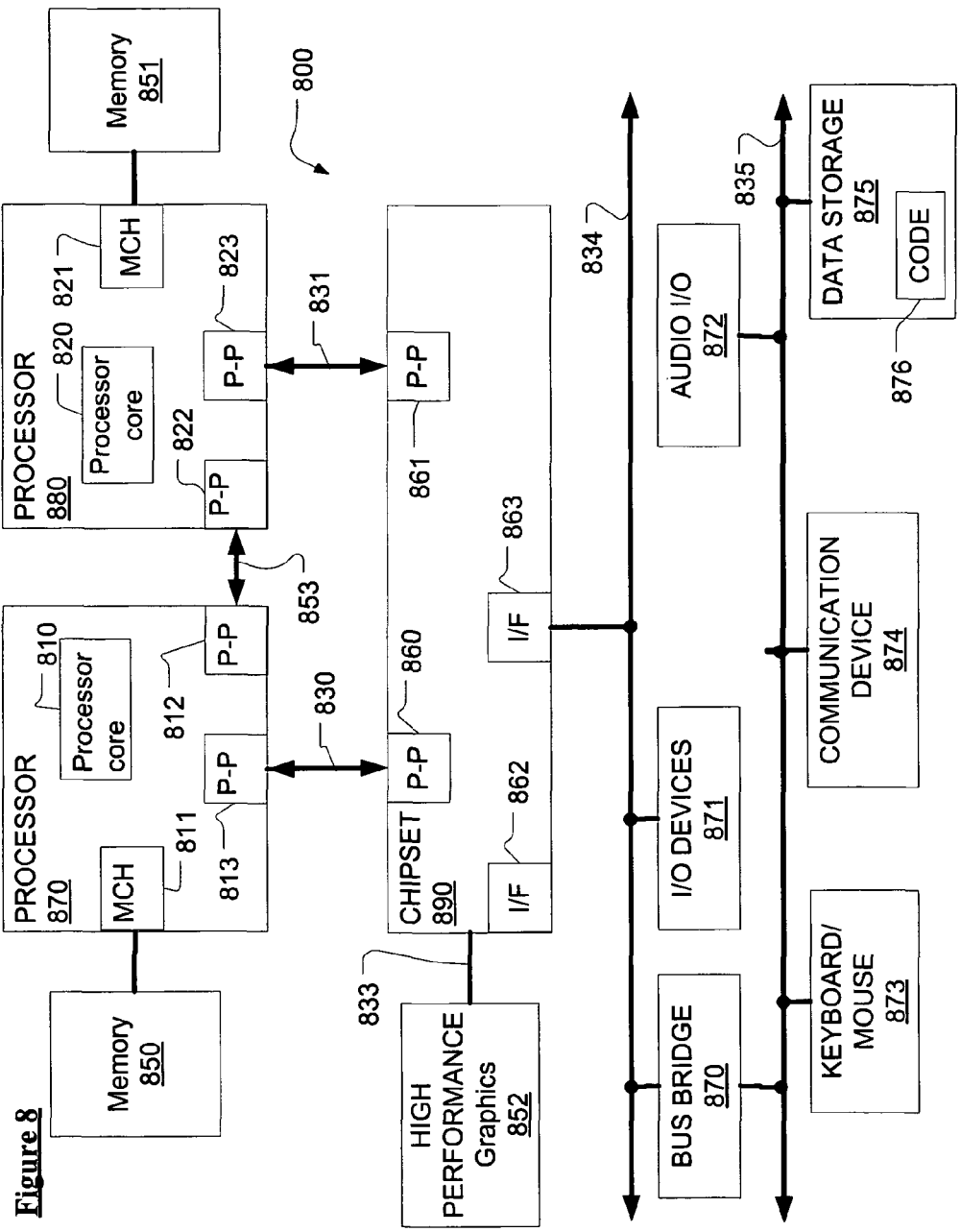
FIG. 8 illustrates a point-to-point computer system in which one embodiment of the invention may be used

Similarly, at least one embodiment may be implemented within a point-to-point computer system. FIG. 8, for example, illustrates a computer system that is arranged in a point-to-point (PtP) configuration. In particular, FIG. 8 shows a system where processors, memory, and input/output devices are interconnected by a number of point-to-point interfaces.

The system of FIG. 8 may also include several processors, of which only two, processors 870, 880 are shown for clarity. Processors 870, 880 may each include a local memory controller hub (MCH) 811, 821 to connect with memory 850, 851. Processors 870, 880 may exchange data via a point-to-point (PtP) interface 853 using PtP interface circuits 812, 822. Processors 870, 880 may each exchange data with a chipset 890 via individual PtP interfaces 830, 831 using point to point interface circuits 813, 823, 860, 861. Chipset 890 may also exchange data with a high-performance graphics circuit 852 via a high-performance graphics interface 862. Embodiments of the invention may be located within any processor having any number of processing cores, or within each of the PtP bus agents of FIG. 8.

Other embodiments of the invention, however, may exist in other circuits, logic units, or devices within the system of FIG. 8. Furthermore, in other embodiments of the invention may be distributed throughout several circuits, logic units, or devices illustrated in FIG. 8.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. An apparatus comprising:
a first cache memory, including a first plurality of cache lines each including a first storage area to store a first status indicator to indicate whether data in the associated cache line have been reused previously;
a second cache memory coupled to the first cache memory, including a second cache line including a second storage area to store the data and a second status indicator to indicate whether the data is potentially streaming data; and
a first controller coupled to the first cache memory and configured to set the second status indicator of the second cache line in the second cache memory based on the first status indicator and a counter associated with the second cache line of the second cache memory, wherein the first cache memory is to store a portion of data stored in the second cache memory.

2. The apparatus of claim 1, wherein the second status indicator is to be cleared if data in a cache line of the plurality of first cache lines are evicted when the first status indicator is set.

3. The apparatus of claim 2, further comprising:
a second controller coupled to the first cache memory and configured to classify the data as non-streaming data when the counter equals a first value, wherein the counter is decremented when data from the first cache line are brought from the second cache memory when the second status indicator is set.

4. The apparatus of claim 3, wherein the second controller is configured to clear the second status indicator of the second cache line to indicate that the data is not streaming data.

5. The apparatus of claim 4, wherein the second controller is configured to further initialize the counter to an initialization value.

6. The apparatus of claim 4, wherein the second controller is configured to classify the data as potentially streaming data when the counter does not equal a first value, and to decrement the counter.

7. The apparatus of claim 6, wherein the second controller is configured to set the second status indicator of the second cache line to indicate that the data is potentially streaming data.

8. The apparatus of claim 2, further comprising:
a second controller coupled to the second cache memory and configured to change the second status indicator when the counter reaches a first value, wherein the counter is decremented when data from the cache line are evicted when the first status indicator is clear.

9. The apparatus of claim 2, further comprising a second controller coupled to the second cache memory and configured to change a value of the second status indicator when the counter reaches a first value, wherein the counter is decremented when data from the cache line are evicted when the first status indicator is clear and a hit occurs in a predetermined number of most recently used (MRU) ways of the second cache memory.

10. The apparatus of claim 9, wherein the second controller is configured to set the counter to a second value when it reaches the first value and wherein a value of the counter is increased by a first multiplier of the value when data from one or more cache lines of the first plurality of cache lines are evicted when the first status indicator is clear, until the counter saturates.

11. A method comprising:
evicting a cache line from a level-N cache;
checking a first status indicator bit stored in the cache line of the level-N cache to determine if the cache line was reused while in the level-N cache; and
setting or clearing a second status indicator bit of a cache line in a level-(N+1) cache based on the first status indicator bit associated with the cache line from the level-N cache and a counter value associated with the cache line in the level-(N+1) cache, wherein the first status indicator bit is a reuse indicator and the second status indicator bit is a potential streaming indicator.

12. The method of claim 11, further comprising:
if the cache line was not reused while in the level-N cache:
checking the counter value to determine if the counter value reaches a first value;
setting the counter value to a second value if the counter value reaches the first value;
clearing the second status indicator bit if the counter value reaches the first value;
decreasing the counter value if the counter value has not reached the first value; and
setting the second status indicator bit if the counter value has not reach the first value.

13. The method of claim 12, further comprising:
setting the second status indicator bit if the cache line was not reused while in the level-N cache.

14. A processor comprising:
a core;
a first cache memory coupled to the core and including a plurality of first cache lines each to store data and a first status indicator to indicate whether the corresponding data was reused;
a second cache memory coupled the first cache memory coupled to the core and including a plurality of second cache lines each to store data and a second status indicator to indicate whether the corresponding data is potentially streaming;
a counter associated with at least one of the plurality of second cache lines; and
a controller coupled to the second cache memory and configured to write a first state to the second status indicator of a first one of the second cache lines when the first status indicator of a first cache line to be provided to the first one of the second cache lines indicates that the second cache line was not reused and the counter equals a first value, the first state to indicate that the corresponding data is not potentially streaming data.

15. The system of claim 14, wherein the controller is configured to write a second state to the second status indicator to indicate that the corresponding data is potentially streaming data.

16. The system of claim 14, wherein the controller is configured to initialize the counter to an initialization value.

* * * * *